No. 893,126.　　　　　　　　　　　　　　　　　　　PATENTED JULY 14, 1908.
H. BAETZ.
FEED MECHANISM FOR DRYING APPARATUS.
APPLICATION FILED NOV. 22, 1907.
2 SHEETS—SHEET 1.
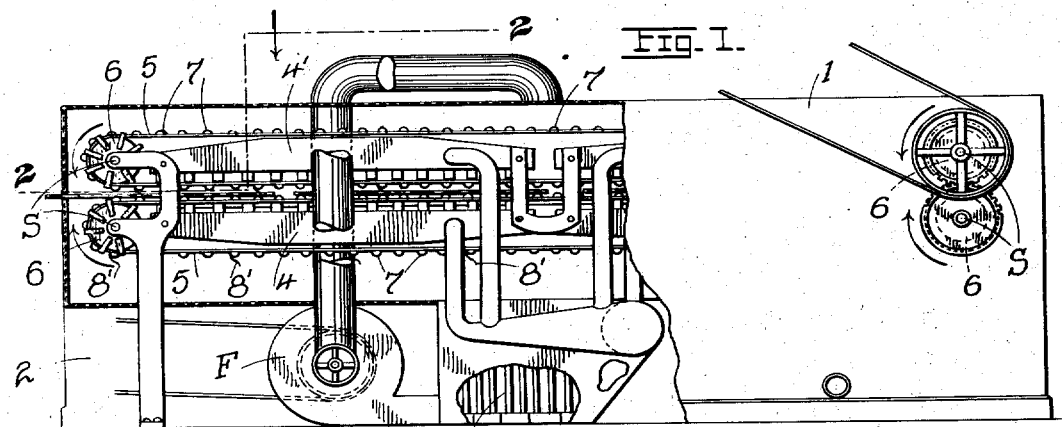
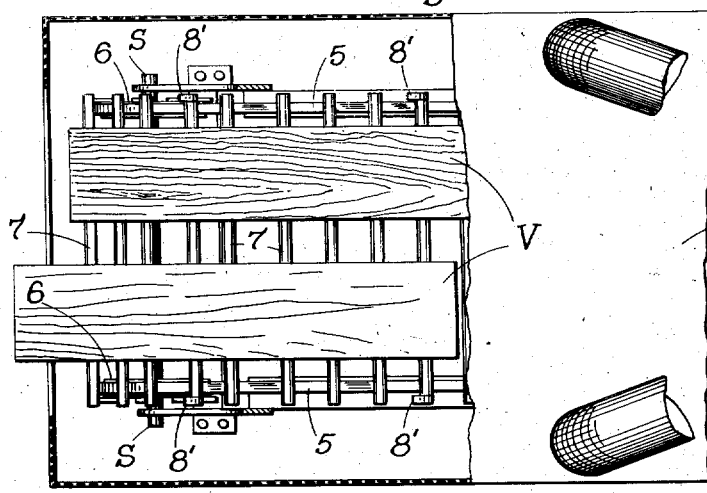
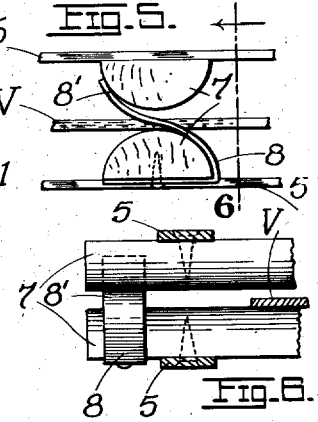
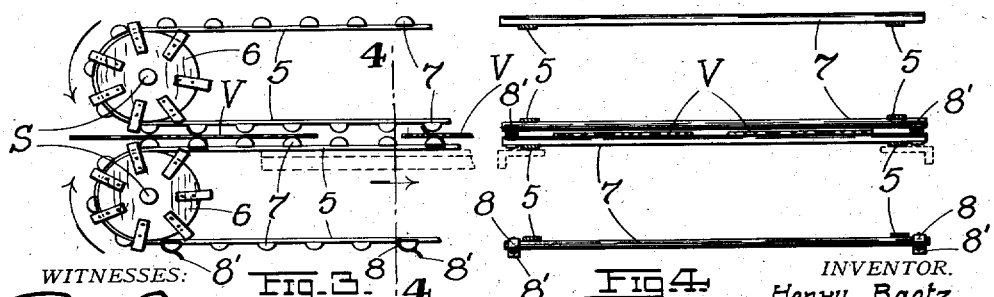
WITNESSES:
INVENTOR.
Henry Baetz
BY
ATTORNEY.

UNITED STATES PATENT OFFICE.

HENRY BAETZ, OF ST. LOUIS, MISSOURI.

FEED MECHANISM FOR DRYING APPARATUS.

No. 893,126.  Specification of Letters Patent.  Patented July 14, 1908.

Application filed November 22, 1907. Serial No. 403,390.

*To all whom it may concern:*

Be it known that I, HENRY BAETZ, citizen of the United States, residing at St. Louis, State of Missouri, have invented certain new and useful Improvements in Feed Mechanism for Drying Apparatus, of which the following is a full, clear, and exact description, reference being had to the accompanying drawings, forming a part hereof.

My invention has relation to improvements in feed mechanism or conveyers for veneer drying apparatus; and it consists in the novel arrangement and combination of parts more fully set forth in the specification and pointed out in the claims.

Figure 7:
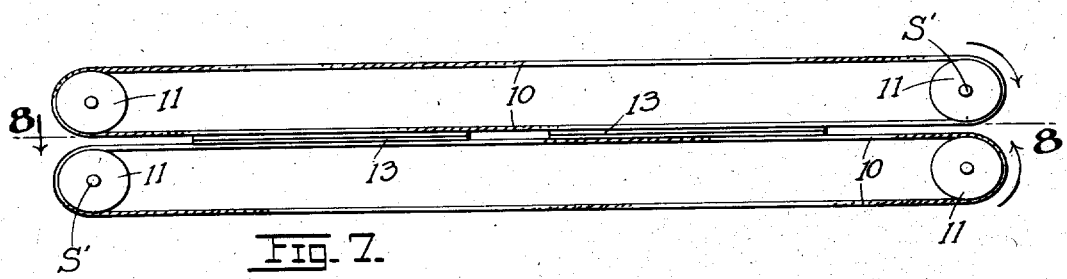
Figure 8:
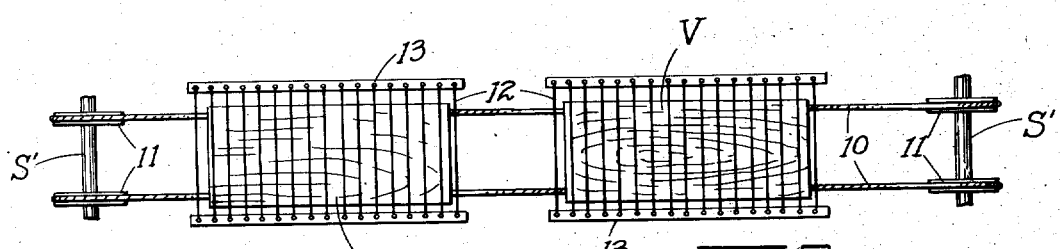
Figure 10:
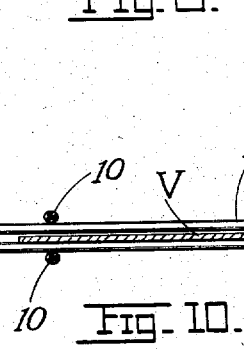
Figure 9:
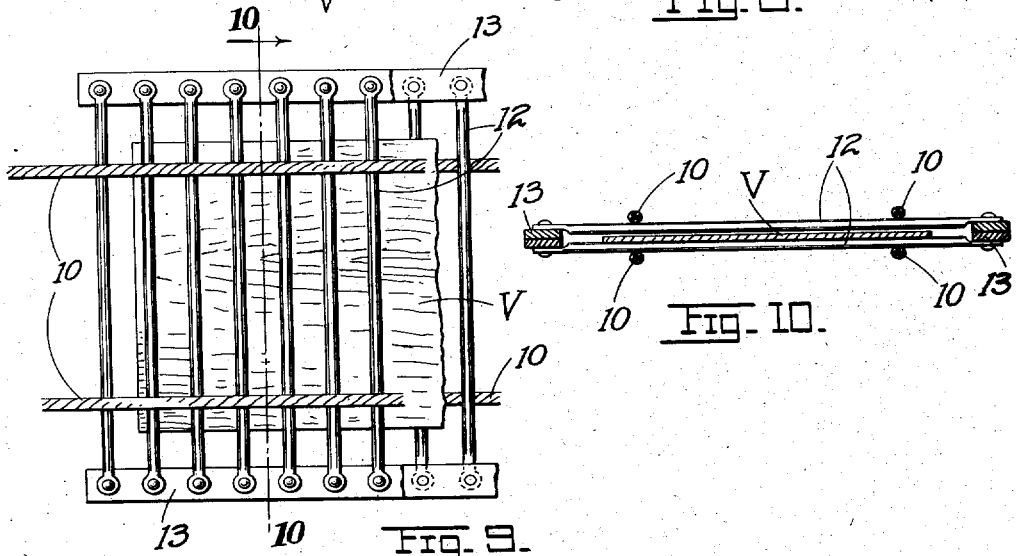

In the drawings, Figure 1 is a side elevation of a drying apparatus with walls partly broken away showing one form of my invention applied thereto; Fig. 2 is a horizontal section on the broken line 2—2 of Fig. 1; Fig. 3 is a side elevation of one end of a pair of juxtaposed conveyers constituting my feed mechanism; Fig. 4 is a vertical transverse section on the line 4—4 of Fig. 3; Fig. 5 is an enlarged elevational detail showing the sides of the conveyers and the ends of the slats mounted thereon; Fig. 6 is a vertical transverse section on the line 6—6 of Fig. 5; Fig. 7 is a side elevation of a modified form of feed mechanism; Fig. 8 is a horizontal section on the line 8—8 of Fig. 7, being virtually a top plan of the lower conveyer with its complement of gates of the upper conveyer; Fig. 9 is an enlarged top plan of two superposed gates and the cables by which they are impelled, shown in side elevation in Fig. 7; and Fig. 10 is a vertical transverse section on the line 10—10 of Fig. 9.

The present invention is not confined to any particular design of drying apparatus, though in a general way it is intended for use on such driers in which provision is made for allowing or causing the heated air to travel crosswise of the general direction of travel of the conveyer on which the material to be dried, is carried. An example of such drying apparatus may be found in my U. S. Patent 835,843, dated Nov. 13, 1906. In this patent I have shown a feed mechanism generically comprising a pair of juxtaposed conveyers having transverse rib or slat formations between which the articles to be dried are confined, any available means for holding the conveyers in said juxtaposed relation being contemplated in said patent.

In drying veneer of one-eighth inch or more in thickness, the pressure thereon incident to the sagging of the lower lap of the upper conveyer is easily overcome, the veneer sheets readily and freely shrinking during the drying operation without material warping, and without splitting. In the case of very thin veneer, for example sheets one-sixteenth, one-twenty-fifth, or less in thickness, any material sag of the lower lap of the upper conveyer is apt to produce a pressure on the veneer in excess of what such thin sheets can effectively resist, and as a consequence, the freedom which should be accorded them for the necessary movement, which they undergo while shrinking (during the drying operation) is interfered with to a greater or less degree, and there is consequent danger of the material splitting from the excessive pressure to which it is thus subjected under an abnormal sag of the lower lap of such upper conveyer.

It is the object of the present invention therefore to provide means for keeping the exposed surfaces of the slats or ribs of the coöperating or opposed laps of any pair of juxtaposed conveyers spaced permanently apart, such space being substantially equal to, or slightly in excess of the thickness of the veneer sheet to be treated. These spacing means are located on the sides of the conveyers, and though I herein illustrate two specific forms of such spacing means, it is to be understood that these forms merely serve as examples of a variety of devices which might be employed for the purpose in view. With the planes of travel of the opposing slats thus spaced permanently apart, it is apparent that thin sheets of veneer are substantially relieved of any undue pressure resulting from the sag of the lower lap of the upper conveyer, and since the pressure which such sheets suffer is almost wholly confined to that which results from the limited buckling or warping of the sheets against the upper conveyer, their freedom to shrink is in no wise interfered with, and the sheets dry without splitting.

In my patent referred to, a permanent spacing between the slats of the opposed laps, while practically possible for short lengths by sufficient stretching of the chains, is impracticable for great lengths, and consequently by the use of the invention here described, the stretching of the belts need not be resorted to. The advantages of the invention will be best apparent from a detailed description thereof which is as follows:

Referring to the drawings, and for the present to Figs. 1 to 6 inclusive, which show a casing 1, a fan F, a fan-chamber 2, heater 3, hot-air chambers or headers 4, 4' as in my Patent 835,843 above referred to, the operation of which is already well known and understood, 5, 5, represent endless bands mounted between sprocket disks 6, 6, carried on the shafts S, the bands passing around the chambers 4, 4'. Each pair of bands is connected by cross slats, tubes, strips, bars, ribs or equivalent transverse formations 7, spaced three or four inches apart, said formations collectively constituting the carrying surface for the conveyer-belt thus formed, the adjacent laps of the conveyers traveling jointly in the space between the hot-air chambers or headers, and forming a feed mechanism for the veneer V to be dried. In this particular the present invention conforms to the generic idea covered in my patent aforesaid. One pair of disks is suitably geared as shown in Fig. 1, whereby the conveyers may be conjointly driven, the character and construction of the driving means being immaterial. The radial arms or teeth on the outer faces of the sprocket disks engage the slats and thus impel the conveyers. As in my patent referred to the slats are curved in cross section (and preferably semicircular) so that they may present the smallest possible surface of contact (a mere line) to the veneer being dried and confined between them.

In the case of comparatively short lengths of belt, the same may be conveniently stretched to keep the slats constituting the lower lap of the upper conveyer sufficiently out of contact with the slats constituting the upper lap of the lower conveyer; but for conveyers measuring twenty, thirty, and forty feet or more the sag of the lower lap of the upper belt is apt to bring some of the slats into actual contact. In treating comparatively thick sheets of veneer the pressure due to the sag is effectively resisted by the sheets, the same being free to shrink without splitting during the drying operation, but very thin sheets should be relieved of any undue pressure due to this sag, and I accordingly make provision for keeping the slats of the adjacent laps permanently apart without resorting to the stretching of the belts.

While I do not wish to limit myself to the specific means here illustrated, those here shown I have found effective and reliable in practice, and referring again to the figures mentioned, such means may be described as follows: At the end of say every sixth slat I secure a metal strip 8 bent around the flat side of the slat and secured thereto, and thence passed partially over the curved face of the slat and extended a suitable distance beyond the same thus forming a spacing piece or finger 8' whose end engages an opposing slat of the adjacent lap of the opposite conveyer at a point to one side of the center of such slat, the finger thus extending from the edge of one slat diagonally across the space between the slats and forming the necessary support for the opposing slat. Preferably, the spacing pieces are on the lower conveyer though obviously they may be on the upper one and engage the upper lap of the lower conveyer without affecting the principle or nature of the invention. In practice a spacing piece every sixth slat is sufficient, as the belt can not and does not sag perceptibly between two consecutive pieces (the distance between two spacing pieces being about twenty inches). By the above arrangement, the slats of the opposed laps of the juxtaposed conveyers are thus kept permanently apart, and a thin sheet of veneer is free to shrink without being subjected to any pressure, except the incidental pressure resulting from undue warping of the sheet, in which event actual contact with the slats of the lower lap of the upper conveyer may result. The pressure incidental to warping would be very slight, the warping being reduced to a minimum by virtue of the uniformity with which the sheets dry under my construction. The hot air currents traverse the veneer in the channels formed between the slats, unobstructed and at right angles to the line of travel of the conveyers and at right angles to the grain of the veneer, the same as in my patent aforesaid, and a uniform, superior, and perfect product is the result. The fingers engaging as they do the opposing slats at a point beyond the center of the curved face of the slat insures against possible separation of the slats constituting any opposing pair, the conveyers traveling in the direction shown by the arrows in Figs. 1 and 3, that is to say, in the direction which the concavity of the finger or spacing piece 8' faces. The precise configuration of the spacing piece or finger here shown need not of course be adhered to in practice, though the one illustrated answers every purpose. The finger is resilient and bearing and pressing as it does against an opposing slat in a slightly diagonal direction (Fig. 5), it not only serves as a positive support therefor, but in a measure tends to keep taut the band 5 on which the slats are mounted.

As stated above, I do not wish to be limited either to the precise details of construction of the conveyer or of the spacing means by which the slats of the opposing laps are kept apart; and in Figs. 7 to 10 inclusive I show a pair of juxtaposed conveyers composed of two sets of endless bands or cables 10 traveling around sheaves 11, 11 on the shafts S', the upper laps of the lower set of cables supporting a metal gate or grating composed of cross bars or slats 12 and side bars 13, the ends of the slats being secured to the outer faces of the side bars. When a pair of gates are superposed one over the other with the side bars 13 in contact, it follows that the opposing slats of the gates will be separated a distance equal to twice the thickness of a single side bar, or the thickness of two superposed side-bars. The upper gate of each pair is of course held against displacement by the lower laps of the upper set of cables, the lower gate resting on the upper laps of the lower set of cables. The pairs of gates (of which any number may be disposed throughout the length of the drying chamber) thus constitute pairs of juxtaposed conveyers having cross slats, and having means at the ends of the slats for keeping the opposing members of the several pairs of slats 12 permanently apart. The side bars too serve to close the sides of the feed mechanism thus resulting from the superposition of two gates, each gate constituting a section provided with cross-slats held in opposed and juxtaposed relation to the slats of its coöperating gate or section. By analogy, the separate laps of the conveyers shown in Figs. 1 to 6, may be considered as constituting the component sections of a feed mechanism which contemplates their conjoint use during the drying operation.

Such features of construction as may be illustrated but to which no reference is herein made are either well known or covered in previous patents issued to me, and there is no occasion to enter into a description thereof at this time. Obviously the material to be dried need not be limited to veneer.

It is to be observed that the present improvement in no wise contemplates a different mode of operation from that of the invention covered by U. S. Patent 835,843 referred to. Both forms of apparatus cover a pair (one or more) of juxtaposed transversely slatted conveyers (the spaces between the slats or transverse formations being of course open), the material being confined between opposing members of successive pairs of slats of the adjacent laps of such juxtaposed conveyers. By "opposing members" of course is not necessarily meant that the members shall be vertically in the same straight line, but that the extreme elements forming the veneer-engaging surfaces of the slats in the lower lap or run of the upper conveyer shall be disposed in a plane of travel immediately over the plane of disposition and travel of the corresponding elements forming the veneer-engaging surfaces of the slats of the upper run of the lower conveyer; for it is only that character of opposed relation which will permit contact of the slats with the veneer along lines or reduced surfaces as contemplated by the patent. Every slat of the lower conveyer will of course have a corresponding slat in the upper conveyer in opposed relation thereto, since it takes at least two opposed slats to confine the material, but such confinement shall never be so intense as to prevent the material freely shrinking during drying. A positive and material embedding of the slats into the material so that the latter is no longer free to shrink while drying is neither contemplated in the patent nor in the present improvement thereon; and it is to maintain that delicate relation between the adjacent laps of juxtaposed conveyers operating on thin veneer that spacing means of the general character here shown and claimed are resorted to on the sides of the conveyers, since thin veneer sheets are characteristically sensitive to any undue pressure which may result from the sag of a long conveyer incapable of complete control by mere stretching. Obviously, however, and like in my patent aforesaid, the range of juxtaposition (or nearness) between the coöperating runs of any pair of conveyers lies within narrow limits, but they are limits such as to always insure perfect freedom of shrinkage for the material while drying, and at the same time permit the slats to offer at the proper moment the necessary resistance to whatever tendency may yet remain in the material to warp. The slats however contacting as they do only along single lines, so that practically the entire surfaces of both sides of the sheet are simultaneously exposed to the hot air currents, it follows that this tendency to warp will be reduced to a minimum as already set forth in my previous patent. The present improvement is, of course, eminently adapted to operate not only on thin veneer, but on veneer whose thickness corresponds to or slightly exceeds, the full space between the slats of opposing runs of two juxtaposed conveyers.

Having described my invention, what I claim is:

1. A feed mechanism comprising a pair of juxtaposed conveyers, and having transverse rib formations between which the articles may be confined, and means disposed along the length of the conveyers for keeping the adjacent laps of said conveyers spaced permanently apart, substantially as set forth.

2. A feed mechanism comprising a pair of juxtaposed conveyers, and having transverse rib formations between which the articles may be confined, and means disposed at the sides of the conveyers for keeping the adjacent laps of said conveyers spaced permanently apart, substantially as set forth.

3. A feed mechanism comprising a pair of juxtaposed conveyers, and having transverse rib formations between which the articles may be confined, and spacing devices at the sides of, and between the conveyers for keeping the adjacent laps of said conveyers spaced permanently apart, substantially as set forth.

4. A feed mechanism comprising a pair of juxtaposed conveyers, and having transverse rib formations between which the articles may be confined, and spacing devices carried by either one of the conveyers at the sides thereof for keeping the adjacent laps of said conveyers spaced a suitable distance apart, substantially as set forth.

5. A feed mechanism comprising a pair of juxtaposed conveyers, and having transverse rib formations between which the articles may be confined, and spacing fingers carried by the ends of the slats of either one of the conveyers and engaging the opposing slats of the adjacent lap of the second conveyer for permanently keeping the adjacent laps of the conveyers spaced a suitable distance apart, substantially as set forth.

6. A feed mechanism comprising a pair of juxtaposed conveyers having transverse ribs or bars spaced suitable distances apart, the material treated being inserted between the adjacent laps of the conveyers and confined between the aforesaid transverse formations, and means at opposite ends of the transverse formations for permanently keeping the adjacent laps of said conveyers spaced a suitable distance apart, substantially as set forth.

7. A feed mechanism comprising a pair of juxtaposed conveyers having transverse ribs or bars spaced suitable distances apart, the material treated being inserted between the adjacent laps of the conveyers and confined between the aforesaid transverse formations, and means disposed along the sides of the conveyers for permanently keeping the adjacent laps of said conveyers spaced a suitable distance apart, substantially as set forth.

8. A feed mechanism comprising a pair of juxtaposed endless conveyers having transverse ribs or slats spaced suitable distances apart, a rib or slat on one conveyer acting in opposed relation to a rib or slat on the adjacent conveyer, the material treated being inserted between the successive pair of opposed slats of the respective conveyers, and means disposed on the conveyers for permanently keeping the members of the several pairs of opposed slats a suitable distance apart, substantially as set forth.

9. A feed mechanism comprising a pair of juxtaposed endless conveyers having transverse ribs or slats spaced suitable distances apart, a rib or slat on one conveyer acting in opposed relation to a rib or slat on the adjacent conveyer, the material treated being inserted between the successive pair of opposed slats of the respective conveyers, and means disposed on the sides of the conveyers for permanently keeping the members of the several pairs of opposed slats a suitable distance apart, substantially as set forth.

10. A feed mechanism comprising a pair of juxtaposed transversely slotted conveyers contacting along the sides, the slatted portions forming the available carrying surfaces of the conveyers between said sides and being permanently spaced a suitable distance apart during such contact, substantially as set forth.

11. A feed mechanism comprising a pair of juxtaposed endless conveyers having transverse ribs or slats spaced suitable distances apart and forming the available carrying surfaces for said conveyers, the sides of the opposing laps of the conveyers being in contact and the slats being mounted to effect a permanent separation between the opposed surfaces of the adjacent laps during such lateral contact of the conveyers, substantially as set forth.

12. A feed mechanism comprising a pair of transversely slatted sections traveling conjointly and in juxtaposition and closed on the sides, the transverse formations of the respective sections being permanently spaced apart, substantially as set forth.

In testimony whereof I affix my signature, in presence of two witnesses.

HENRY BAETZ.

Witnesses:
EMIL STAREK,
MARY D. WHITCOMB.

---

It is hereby certified that in Letters Patent No. 893,126, granted July 14, 1908, upon the application of Henry Baetz, of St. Louis, Missouri, for an improvement in "Feed Mechanism for Drying Apparatus," an error appears in the printed specification requiring correction, as follows: In line 69, page 4, the word "slotted" should read *slatted*; and that the said Letters Patent should be read with this correction therein that the same may conform to the record of the case in the Patent Office.

Signed and sealed this 4th day of August, A. D., 1908.

[SEAL.]

C. C. BILLINGS,
*Acting Commissioner of Patents.* keeping the adjacent laps of said conveyers spaced permanently apart, substantially as set forth.

4. A feed mechanism comprising a pair of juxtaposed conveyers, and having transverse rib formations between which the articles may be confined, and spacing devices carried by either one of the conveyers at the sides thereof for keeping the adjacent laps of said conveyers spaced a suitable distance apart, substantially as set forth.

5. A feed mechanism comprising a pair of juxtaposed conveyers, and having transverse rib formations between which the articles may be confined, and spacing fingers carried by the ends of the slats of either one of the conveyers and engaging the opposing slats of the adjacent lap of the second conveyer for permanently keeping the adjacent laps of the conveyers spaced a suitable distance apart, substantially as set forth.

6. A feed mechanism comprising a pair of juxtaposed conveyers having transverse ribs or bars spaced suitable distances apart, the material treated being inserted between the adjacent laps of the conveyers and confined between the aforesaid transverse formations, and means at opposite ends of the transverse formations for permanently keeping the adjacent laps of said conveyers spaced a suitable distance apart, substantially as set forth.

7. A feed mechanism comprising a pair of juxtaposed conveyers having transverse ribs or bars spaced suitable distances apart, the material treated being inserted between the adjacent laps of the conveyers and confined between the aforesaid transverse formations, and means disposed along the sides of the conveyers for permanently keeping the adjacent laps of said conveyers spaced a suitable distance apart, substantially as set forth.

8. A feed mechanism comprising a pair of juxtaposed endless conveyers having transverse ribs or slats spaced suitable distances apart, a rib or slat on one conveyer acting in opposed relation to a rib or slat on the adjacent conveyer, the material treated being inserted between the successive pair of opposed slats of the respective conveyers, and means disposed on the conveyers for permanently keeping the members of the several pairs of opposed slats a suitable distance apart, substantially as set forth.

9. A feed mechanism comprising a pair of juxtaposed endless conveyers having transverse ribs or slats spaced suitable distances apart, a rib or slat on one conveyer acting in opposed relation to a rib or slat on the adjacent conveyer, the material treated being inserted between the successive pair of opposed slats of the respective conveyers, and means disposed on the sides of the conveyers for permanently keeping the members of the several pairs of opposed slats a suitable distance apart, substantially as set forth.

10. A feed mechanism comprising a pair of juxtaposed transversely slotted conveyers contacting along the sides, the slatted portions forming the available carrying surfaces of the conveyers between said sides and being permanently spaced a suitable distance apart during such contact, substantially as set forth.

11. A feed mechanism comprising a pair of juxtaposed endless conveyers having transverse ribs or slats spaced suitable distances apart and forming the available carrying surfaces for said conveyers, the sides of the opposing laps of the conveyers being in contact and the slats being mounted to effect a permanent separation between the opposed surfaces of the adjacent laps during such lateral contact of the conveyers, substantially as set forth.

12. A feed mechanism comprising a pair of transversely slatted sections traveling conjointly and in juxtaposition and closed on the sides, the transverse formations of the respective sections being permanently spaced apart, substantially as set forth.

In testimony whereof I affix my signature, in presence of two witnesses.

HENRY BAETZ.

Witnesses:
EMIL STAREK,
MARY D. WHITCOMB.

---

It is hereby certified that in Letters Patent No. 893,126, granted July 14, 1908, upon the application of Henry Baetz, of St. Louis, Missouri, for an improvement in "Feed Mechanism for Drying Apparatus," an error appears in the printed specification requiring correction, as follows: In line 69, page 4, the word "slotted" should read *slatted;* and that the said Letters Patent should be read with this correction therein that the same may conform to the record of the case in the Patent Office.

Signed and sealed this 4th day of August, A. D., 1908.

[SEAL.]

C. C. BILLINGS,
*Acting Commissioner of Patents.*

Correction in Letters Patent No. 893,126.

It is hereby certified that in Letters Patent No. 893,126, granted July 14, 1908, upon the application of Henry Baetz, of St. Louis, Missouri, for an improvement in "Feed Mechanism for Drying Apparatus," an error appears in the printed specification requiring correction, as follows: In line 69, page 4, the word "slotted" should read *slatted;* and that the said Letters Patent should be read with this correction therein that the same may conform to the record of the case in the Patent Office.

Signed and sealed this 4th day of August, A. D., 1908.

[SEAL.]

C. C. BILLINGS,
*Acting Commissioner of Patents.*